United States Patent [19]
Wei et al.

[11] Patent Number: 5,682,082
[45] Date of Patent: Oct. 28, 1997

[54] TRANSLUCENT POLYCRYSTALLINE ALUMINA AND METHOD OF MAKING SAME

[75] Inventors: George Wei, Weston; Arlene Hecker, Beverly; David Goodman, Amesbury, all of Mass.

[73] Assignee: Osram Sylvania Inc., Danvers, Mass.

[21] Appl. No.: 681,739

[22] Filed: Jul. 29, 1996

[51] Int. Cl.$^6$ .............................. H01J 61/30; C04B 35/10
[52] U.S. Cl. ...................... 313/636; 313/638; 313/573; 501/152; 501/153
[58] Field of Search ........................... 313/636, 493, 313/573, 638; 501/11, 46, 48, 50, 51, 52, 62, 64, 66, 69, 72, 89, 100, 101, 103, 104, 105, 107, 108, 123, 126, 127, 135, 152, 153, 154, 904, 905

[56] References Cited

U.S. PATENT DOCUMENTS

| | | | |
|---|---|---|---|
| 3,026,210 | 3/1962 | Coble | 106/39 |
| 3,377,176 | 4/1968 | Wolkodoff et al. | 106/46 |
| 3,563,772 | 2/1971 | Jacobus et al. | 313/636 X |
| 3,935,495 | 1/1976 | Scott, Jr. et al. | 313/636 X |
| 4,285,732 | 8/1981 | Charles et al. | 106/57 |
| 4,567,396 | 1/1986 | McVey | 313/25 |
| 4,580,075 | 4/1986 | Strok | 313/636 X |
| 4,633,137 | 12/1986 | Scott et al. | 313/636 |
| 4,841,195 | 6/1989 | De With et al. | 313/636 X |
| 5,451,553 | 9/1995 | Scott et al. | 313/636 X |

OTHER PUBLICATIONS

European Patent Applciantion No. 93–119959.0 Dec. 1993.

*Primary Examiner*—Ashok Patel
*Attorney, Agent, or Firm*—William H. McNeill

[57] ABSTRACT

An optically transparent polycrystalline alumina sintered body consists essentially of alumina, magnesia, yttria and zirconia. The magnesia is present in an amount of about 0.020 wgt. percent, the yttria is present in an amount of about 0.035 wgt. percent, and the zirconia is present in an amount of about 0.018 wgt. percent. An arc tube for a high pressure sodium lamp made from this composition has greatly increased resistance to sodium loss and concomitant outer jacket darkening, whereby the effective amount of lumen output is increased.

2 Claims, 3 Drawing Sheets

TRANSLUCENT POLYCRYSTALLINE ALUMINA AND METHOD OF MAKING
SAME

TECHNICAL FIELD

This invention relates to translucent ceramics and more particularly to a high density polycrystalline alumina (PCA) which; when formed into arc tubes for high pressure sodium lamps, shows increased resistance to sodium loss with a concomitant decrease in outer envelope darkening, together with higher efficacy derived from operation at higher wall temperatures.

BACKGROUND ART

Translucent bodies of PCA are known. Coble, in U.S. Pat. No. 3,026,210 discloses the use of 0.0625 to 0.5 wgt. percent MgO to aid in the elimination of residual porosity by preventing the entrapment of pores inside alumina grains and to control grain growth in the late stages of sintering, when the density exceeds 98%.

Charles, et al., in U.S. Pat. No. 4,285,732, suggests the addition of small amounts of zirconia and/or hafnia to the alumina-magnesia ceramic to control the formation of a second phase, usually, spinel; i.e., magnesium aluminate, $MgAl_2O_4$, which can occur when the magnesia content increases above the solubility level. Grain sizes in the sintered bodies are said to be 20 microns to 50 microns. The range of dopants included 0.030–0.150 wgt. percent magnesia and 0.002–0.070 wgt. percent zirconia and/or hafnia.

McVey, in U.S. Pat. No. 4,567,396, teaches that the composition of U.S. Pat. No. 4,285,732 can be employed in a high pressure sodium lamp of increased efficacy, because sodium loss is minimized and the arc tube can be operated at higher wall temperatures.

U.S. Pat. No. 3,377,176 discloses an alumina composition employed in arc tubes and utilizing 0.05 wgt. percent magnesia and 0.035 wgt. percent yttria.

Maekawa et al., in European Patent Application No. 93-119959.0, disclose a triple doped alumina including 0.010–0.080 wgt. percent magnesia, 0.001–0.030 wgt. percent yttria, and 0.020–0.120 wgt. percent zirconia. The primary example disclosed contained, in wgt. percent, 0.020 magnesia, 0.002 yttria and 0.040 zirconia.

While all of these materials perform well, all exhibit a loss in lumens over time because of outer envelope wall blackening. Additionally, high percentages of zirconia have been thought to be detrimental to brick of the firing furnaces.

It would be an advance in the art if such lamps could be provided having high efficacy and less outer wall blackening whereby a high percentage of original transmittance could be maintained.

DISCLOSURE OF INVENTION

It is, therefore, an object of the invention to enhance the manufacture of translucent ceramics.

It is another object of the invention to produce translucent ceramics having a small grain size with optimal density and having less tendency to cause outer envelope darkening.

Yet another object of the invention is provision of an arc tube for a high pressure sodium lamp having increased efficacy and improved lumen maintenance.

These objects are accomplished, in one aspect of the invention, by the provision of an optically translucent polycrystalline body consisting essentially of about 0.020 wgt. percent magnesia, about 0.018 wgt. percent zirconia, and about 0.035 wgt. percent yttria.

A method of making such a translucent ceramic article comprises the steps of: forming an aqueous slurry to yield the composition described above. To that composition is added nitric acid to adjust the pH to 4.6. An aqueous binder and plasticizer in the amount of 2.5 solids wgt. percent are then added to the slurry which is then spray-dried. An article is formed by wet-bag isopressing and the article is prefired in air at about 1325° C. for about 2 hours; and then is sintered in hydrogen for about 3 hours at 1830° C.

BEST MODE FOR CARRYING OUT THE INVENTION

Figure 1:
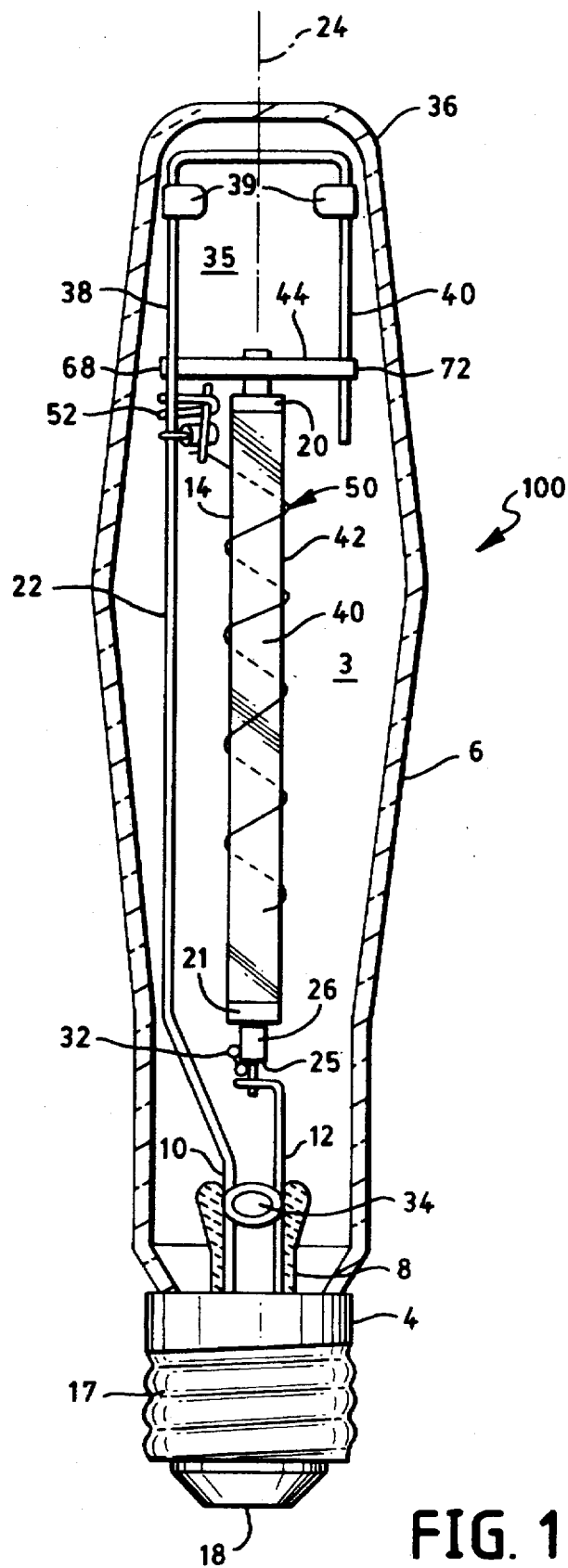
FIG. 1 is a front elevational view of a high pressure sodium lamp which can employ the invention.

For a better understanding of the present invention, together with other and further objects, advantages and capabilities thereof, reference is made to the following disclosure and appended taken in conjunction with the above-described drawing.

Referring now to the drawing with greater particularity, there is shown a high pressure sodium vapor lamp 100 having a vitreous outer envelope 6 with a standard mogul screw base 4 attached to the stem end which is shown lowermost in the figure. A reentrant stem press 8 has a pair of relatively heavy lead-in conductors 10 and 12 extending through the stem 8 and having outer ends of conductors 10 and 12 connected to the screw shell 17 and eyelet 18.

The lamp 100 has an inner envelope or arc tube 14 centrally located within the outer envelope 6. The arc tube 14 is comprised of a length of light transmitting ceramic formed of polycrystalline alumina ceramic which is translucent. The arc tube 14 contains a charge of vaporizable metal which may include the addition of a metal buffer gas such a mercury with an operating range of 0.1 to 5 atmospheres and having an emitting species of sodium at a typical operating pressure of 60 Torr or higher. The upper end of the arc tube 14 is closed by an alumina ceramic plug 20 through which a niobium in-lead 26 projects and which supports an upper electrode (not shown) within the arc tube 14. The lower end of arc tube 14 has a closure which comprises a ceramic plug 21 through which extends a thin-walled niobium tube 26. The niobium tube 26 serves as an in-lead for arc tube 14. The shank of the lower electrode (not shown) of arc tube 14 projects into tube 26 and is locked in place by crimping the tube 26 about the lower electrode at location 25. The arc tube 14 has a tungsten wire 50 coiled thereabout. The wire 50 is connected to one of the electrodes by a thermal switch 52 and is placed between the electrodes where the lowest breakdown voltage is achieved. The thermal switch opens when the lamp is warm so as to minimize electric fields across the tube wall The arc tube 14 is of primary interest to the invention and has an arc chamber 40 defined by walls 42. The arc tube comprises magnesia in an amount of about 0.020 to 0.050 wgt. percent; zirconia in an amount of about 0.018 wgt. percent, and about 0.035 wgt. percent yttria; balance alumina.

The inclusion of zirconia has been shown to inhibit the formation of spinel during lamp operation and processing, which inhibition has been shown to decrease sodium loss while allowing increased wall temperatures. It is known that high pressure sodium lamps can gain 2–3% in lumen output with each 50° C. increase in wall temperature.

The following non-limiting example illustrates the invention.

EXAMPLE 1

A batch alumina powder containing, in wgt. percent, 0.02% MgO, 0.018% $ZrO_2$, 0.035% yttria, and 2.5% organic binder and plasticizer, such as 2.0 wgt. % polyethylene glycol and 0.5% wgt. % polyvinyl alcohol, was prepared by dispersing 500 g of 0.3 μm 65% alpha and 35% gamma alumina at 40% solids in water in which had been added quantitatively analyzed aqueous solutions of magnesium nitrate, zirconium nitrate and yttrium nitrate. Nitric acid was added to adjust the pH to 4.6. Aqueous binder such as polyvinyl alcohol and a plasticizer such as polyethylene glycol were added in the amount of 2.5 solids wgt. percent. The slurry was stirred and then spray-dried, and the resultant power was formed into articles by wet-bag isopressing. The article was pre-fired in air for 2 hours at 1325° C., followed by sintering in hydrogen for 3 hours at 1830° C.

In all instances, the sintered articles produced were discharge vessels suitable for use in high pressure sodium lamps. The discharge vessels were designed for 200 W lamp operation; built into lamps and force tested by operation at 400 W. This test increases sodium reaction, allowing lamps to experience more reactions in 2000 hours than what normal lamp operation requires 24,000 hours to accomplish.

For comparison purposes, the following prior art compositions were also prepared and tested.

EXAMPLE 2

The identical procedure as Example 1 was followed except the composition included 0.02 wgt. percent magnesia, 0.040 wgt. percent zirconia and 0.002 wgt. percent yttria. This composition is described in the aforementioned European Patent Application No. 93-119959.0.

EXAMPLE 3

The identical procedure as Example 1 was followed except that the composition was 0.050 wgt. percent magnesia and 0.040 wgt. percent zirconia. This material is described in U.S. Pat. No. 4,285,732. The sintering cycle was 1880° C. for 3 hours in hydrogen.

The results are shown in Table 1.

TABLE I

| TEST | INITIAL ARC TUBE TRANSMISSION (%) | | KLUMENS | % T | WATTS |
|---|---|---|---|---|---|
| | Total | In-line | | | |
| Ex. 1 | 96.4 | 4.5 | 46.6 | 83.0 | 395 |
| Ex. 2 | 96.3 | 5.4 | 44.3 | 77.8 | 398 |
| Ex. 3 | 95.8 | 11.3 | 41.1 | 55.4 | 405 |
| Control | 96.4 | 6.0 | 32.1 | 35.3 | 378 |

In the Table, KLUMENS represents thousands of lumens and % T represents the percent transmission of the outer jacket in measurements taken at 1000 hours. The control was represented by a standard commercial capsule having as additives 0.05 wgt. percent MgO and 0.035 wgt. percent $Y_2O_3$.

Thus, the composition herein described produces translucent ceramic articles having a greater resistance to sodium reactions than compositions currently employed or described in the literature.

Figure 2:
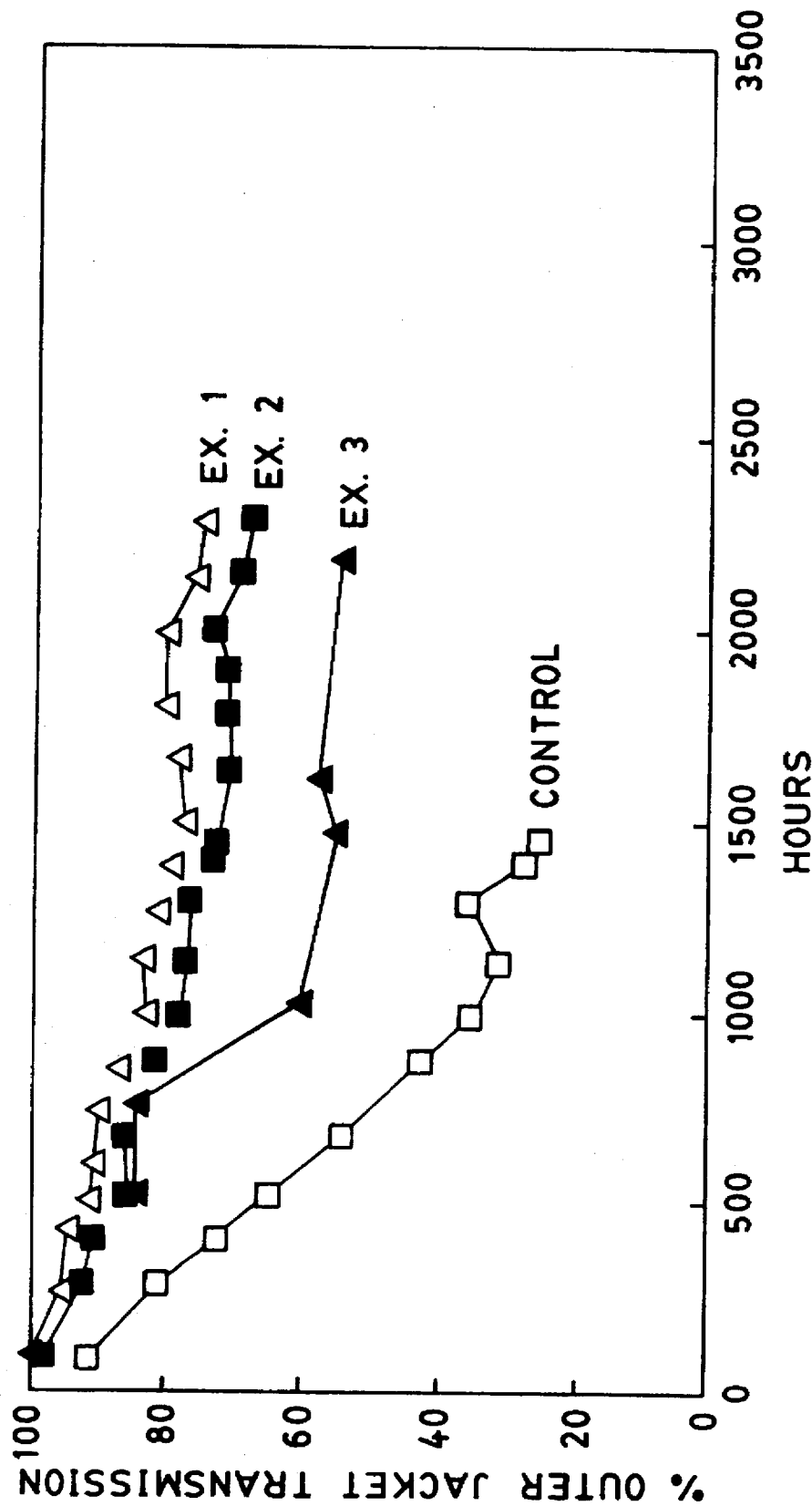
FIG. 2 is a graph of outer jacket darkening versus time for the arc tube of the invention and prior art arc tubes.

The data for the percent of outer jacket darkening versus time represented in Table 1 are graphically presented in FIG. 2, except that they continue beyond the 2000 hour time period.

Figure 3:
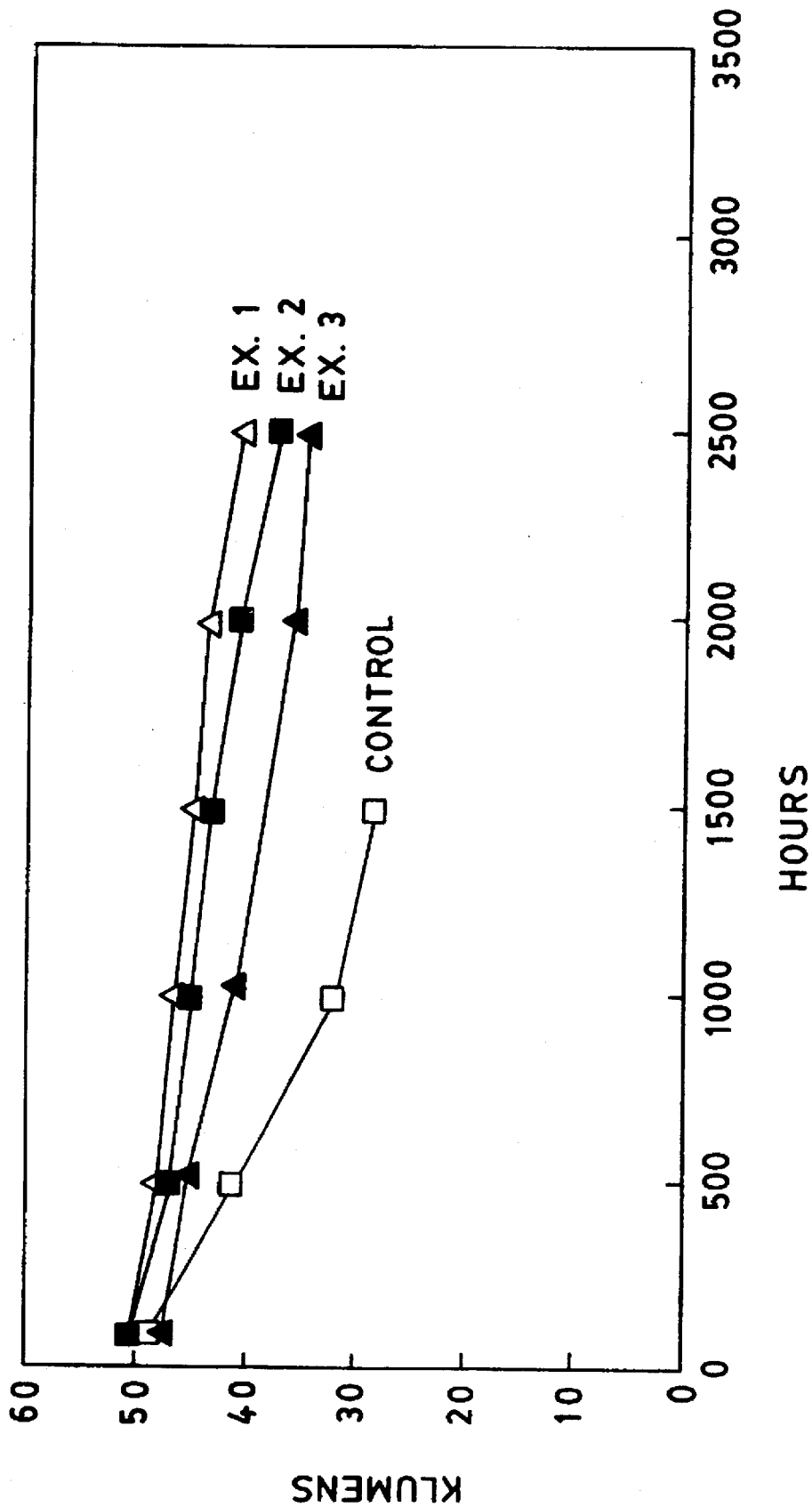
FIG. 3 is a graph of lumens versus time for the arc tube of the invention and prior art arc tubes.

FIG. 3 is a graphical representation of the lumen output, in thousands, as a function of time.

While there have been shown and described what are at present considered the preferred embodiments of the invention, it will be apparent to those skilled in the art that various changes and modifications can be made herein without departing from the scope of the invention as defined by the appended claims.

What is claimed is:

1. In a high pressure sodium lamp an arc tube comprising; magnesia in an amount of about 0.020 wgt. percent; zirconia in an amount of about 0.018 wgt. percent; and about 0.035 wgt. percent yttria; balance being substantially pure alumina.

2. In a high pressure sodium lamp an optically transparent polycrystalline alumina sintered body consisting essentially of alumina, magnesia, yttria and zirconia, said magnesia being present in an amount of about 0.020 wgt. percent, said yttria being present in an amount of about 0.035 wgt. percent, and said zirconia being present in an amount of about 0.018 wgt. percent.

* * * * *